United States Patent

Hamamoto et al.

[11] Patent Number: 5,987,619
[45] Date of Patent: Nov. 16, 1999

[54] INPUT SIGNAL PHASE COMPENSATION CIRCUIT CAPABLE OF RELIABLY OBTAINING EXTERNAL DATA

[75] Inventors: Takeshi Hamamoto; Masaki Tsukude, both of Hyogo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/947,372

[22] Filed: Oct. 8, 1997

[30] Foreign Application Priority Data

May 7, 1997 [JP] Japan .................................. 9-116672

[51] Int. Cl.⁶ ........................................................ G06F 1/04
[52] U.S. Cl. ........................................ 713/401; 713/503
[58] Field of Search .................................. 395/551, 552, 395/558; 327/141, 153, 261, 269, 270, 291, 292

[56] References Cited

U.S. PATENT DOCUMENTS 5,374,860  12/1994  Llewellyn .............................. 327/276
5,621,774   4/1997  Ishibashi et al. ....................... 375/371
5,774,001   6/1998  Mozdzen et al. ....................... 327/141

FOREIGN PATENT DOCUMENTS 5-334878  12/1993  Japan ............................ G11C 11/413
8-180678   7/1996  Japan .............................. G11C 11/34

OTHER PUBLICATIONS

"Technical Report of the Electrical Society" Sep. 18, 1995, pp. 40–46.

Primary Examiner—Dennis M Butler
Attorney, Agent, or Firm—McDermott, Will & Emery

[57] ABSTRACT

An input signal phase compensation circuit having a monitor mode and a normal operation mode includes a mode switching circuit, a logic gate receiving an internal data signal, a delay circuit connected to the logic gate, and a phase comparator comparing, in the monitor mode, phases of a signal output from the delay circuit and a clock signal, and determining time for delaying an internal clock signal in a variable delay circuit so as to match phases of the both signals. In the normal operation mode, the time is fixed, and data is obtained at phase compensated timing.

20 Claims, 14 Drawing Sheets

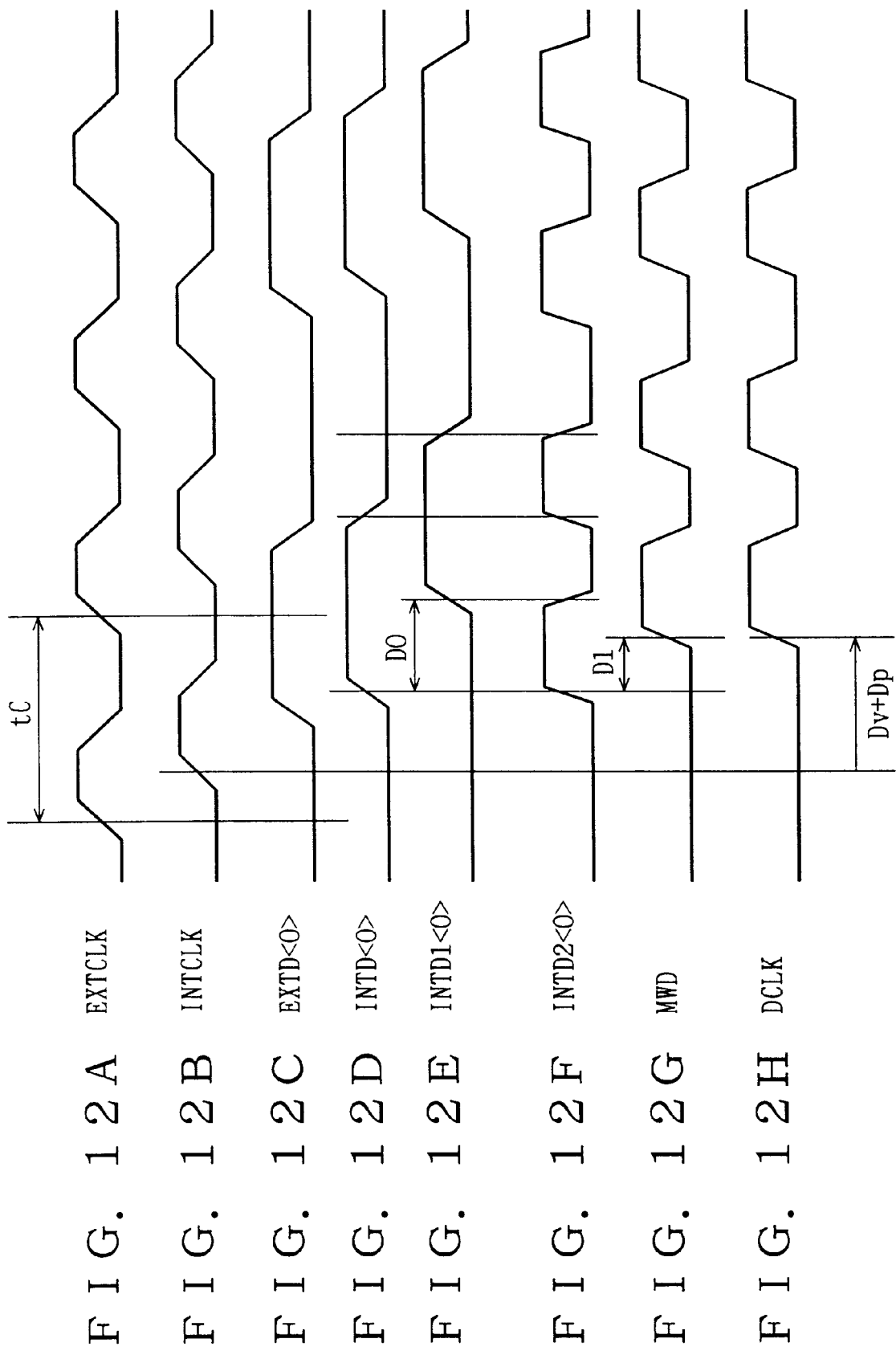

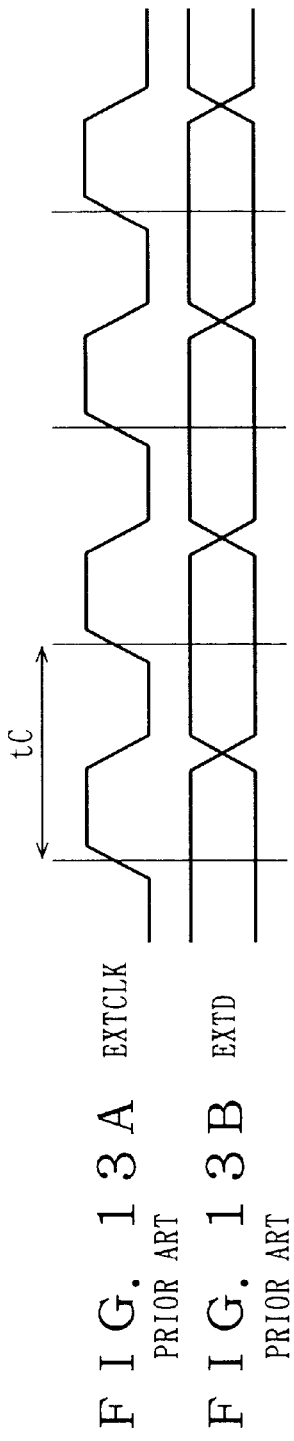
FIG. 13A EXTCLK
PRIOR ART
FIG. 13B EXTD
PRIOR ART
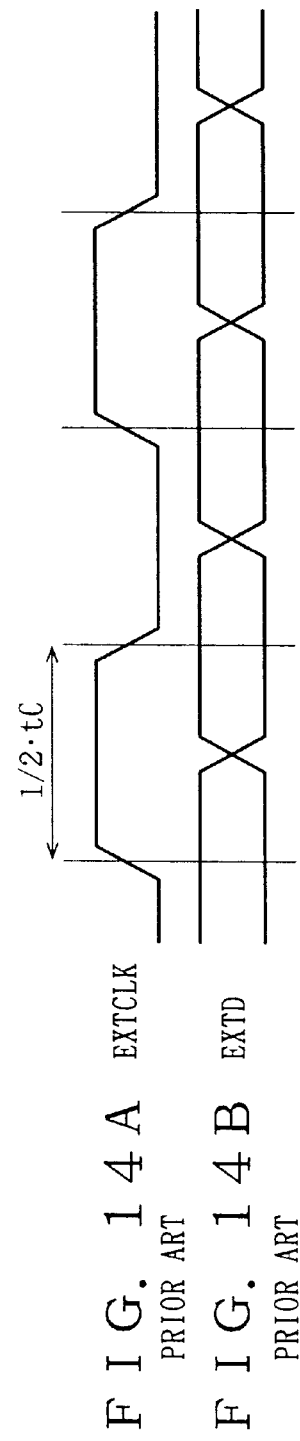
FIG. 14A EXTCLK
PRIOR ART
FIG. 14B EXTD
PRIOR ART
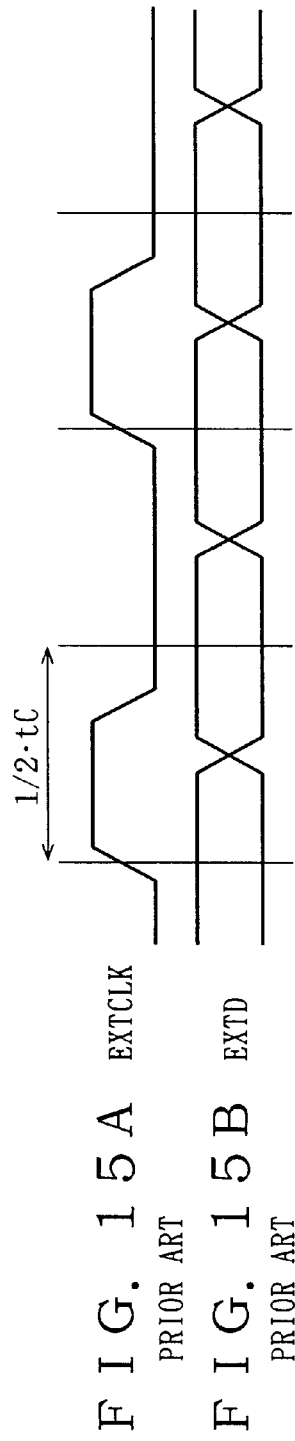
FIG. 15A EXTCLK
PRIOR ART
FIG. 15B EXTD
PRIOR ART

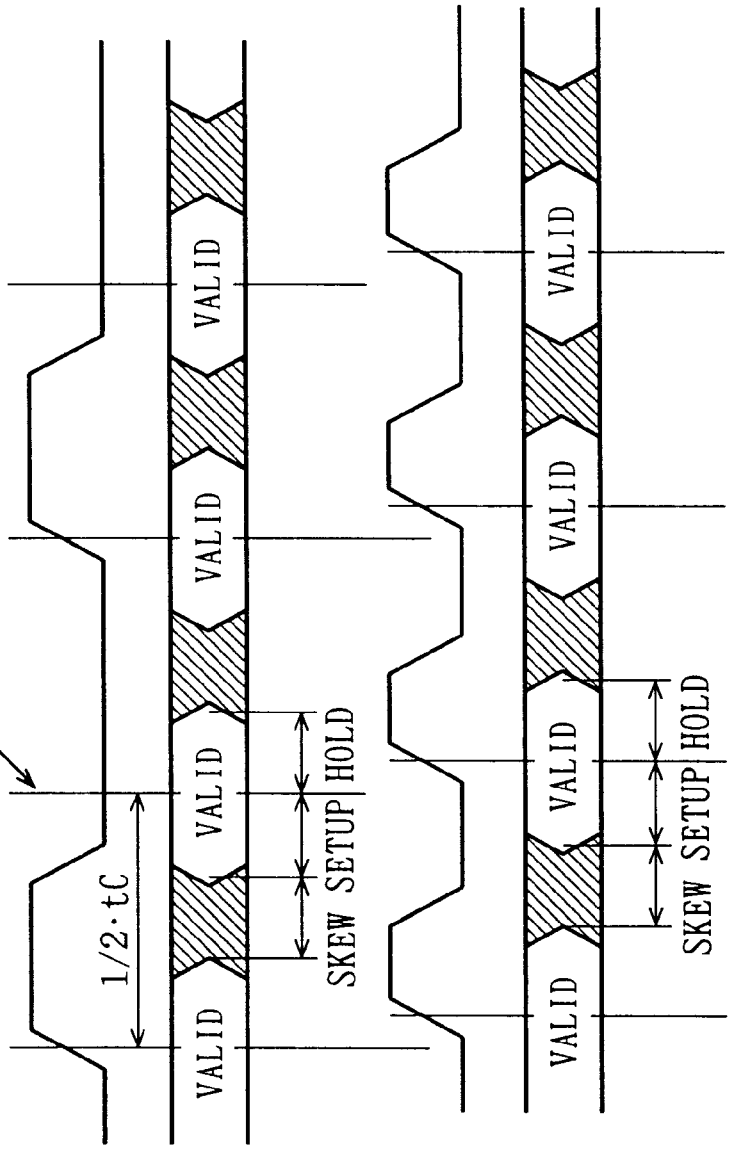

INPUT SIGNAL PHASE COMPENSATION CIRCUIT CAPABLE OF RELIABLY OBTAINING EXTERNAL DATA

BACKGROUND OF THE INVENTION

1. Field of the Invention

The present invention relates to a semiconductor memory device and more particularly to a circuit for compensating for a phase in data input to the semiconductor memory device.

2. Description of the Background Art

A synchronous dynamic random access memory (SDRAM) operating at high speed receives an external control signal, an address signal and write data, in synchronism with an external clock signal, and outputs read data.

Here, a "single data rate" and a "double data rate" will be described with respect to write data reception.

FIGS. 13A and 13B are timing charts illustrating reception of an external data signal EXTD at a "single data rate". As shown in FIGS. 13A and 13B, at the "single data rate" external data signal EXTD shown in FIG. 13B is received in synchronism with a rising edge of an external clock signal EXTCLK shown in FIG. 13A. Therefore, external data signal EXTD is received once in a clock cycle tC of external clock signal EXTCLK.

FIGS. 14A and 14B are timing charts illustrating an example of reception of external data signal EXTD at the "double data rate". As shown in FIGS. 14A and 14B, at the "double data rate" external data signal EXTD shown in FIG. 14B is obtained in synchronism with rising and falling edges of external clock signal EXTCLK shown in FIG. 14A. Therefore, external data signal EXTD is received twice in a clock cycle tC of external clock signal EXTCLK.

FIGS. 15A and 15B are timing charts illustrating another example of reception of external data signal EXTD at the "double data rate".

In this example of the "double data rate", external data signal EXTD shown in FIG. 15B is received twice in a clock cycle tC of external clock signal EXTCLK in synchronism with a rising edge of external clock signal EXTCLK shown in FIG. 15A and also with an edge of a clock signal (not shown) generated inside a device in synchronism with the rising edge and shifted a half period (½·tC) from external clock signal EXTCLK.

Since the SDRAM receives the external control signal, the address signal and the write data in synchronism with the external clock signal as described above, higher speed of the SDRAM operation due to higher frequency of the external clock signal causes a skew between the external clock signal and each of external control signal, address signal and the write data. Referring to FIGS. 16A to 16D, reduction in setup time and hold time will be described with respect to the "double data rate" shown in FIGS. 15A and 15B. The setup time refers to the time from the start of an effective (valid) state allowing data reception until actual data reception (a data reception edge) and the hold time is from the data reception edge to the end of the valid state.

Generally, a memory controller outputs write data in synchronism with a synchronized signal. Since this output write data experiences a mismatch between impedance on a board and that on a memory card before it reaches an SDRAM device from the memory controller, it causes a skew due to difference in transfer delay time of the write data and the external clock signal which are input to the same SDRAM device. Therefore, in the SDRAM device, external input data is valid in the external data reception cycle (½·tC) minus skew time due to transfer delay.

Let us consider the data reception from the outside to the inside of the device, from the view point of internal device operation. An internal clock signal INTDCLK shown in FIG. 16C which is generated by doubling the frequency of the external clock signal shown in FIG. 16A and internal write data INTD received into the device and shown in FIG. 16D cause an undesirable skew. The skew is further increased by characteristics of a clock signal input buffer receiving the external clock signal into the device, a data input buffer receiving external data into the device, a frequency doubler generating internal clock signal INTDCLK by doubling the frequency of the external clock signal which is input to the clock signal input buffer, and so on. Therefore, setup/hold time of internal write data INTD with respect to internal clock signal INTDCLK would be shorter when the device operates at higher frequency.

SUMMARY OF THE INVENTION

An object of the present invention is to provide an input signal phase compensation circuit which can realize a highly reliable semiconductor memory device capable of reliably obtaining external data even in high frequency operation.

According to one aspect of the present invention, the input signal phase compensation circuit having a monitor mode and a normal operation mode includes: an external clock signal input circuit generating a first internal clock signal by buffering an external clock signal; an external data signal input circuit generating an internal data signal by buffering an external data signal; a delay circuit connected to the external data signal input circuit and delaying the internal data signal for a prescribed time period; a first phase compensation circuit connected to the external clock signal input circuit, determining, in the monitor mode, a time period for delaying the first internal clock signal so as to match the phase of the first internal clock signal with the phase of a signal output from the delay circuit, and generating, in the normal operation mode, a second internal clock signal by delaying the first internal clock signal for the time period determined in the monitor mode; and a latch circuit latching the internal data signal in response to the second internal clock signal.

Therefore, a main advantage of the present invention is that the external data signal can reliably be obtained as the internal data signal, even when it is operated by the external clock signal having a high frequency.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A to 12H are timing charts illustrating operation of the input signal phase compensation circuit shown in FIG. 11.

FIGS. 13A to 13B are timing charts illustrating a single data rate in the prior art.

FIGS. 14A to 14B are timing charts illustrating a double data rate in the prior art.

FIGS. 15A to 15B are timing charts illustrating another example of the double data rate in the prior art.

FIGS. 16A to 16D are timing charts illustrating setup/hold time.

DESCRIPTION OF THE PREFERRED EMBODIMENTS

Figure 1:
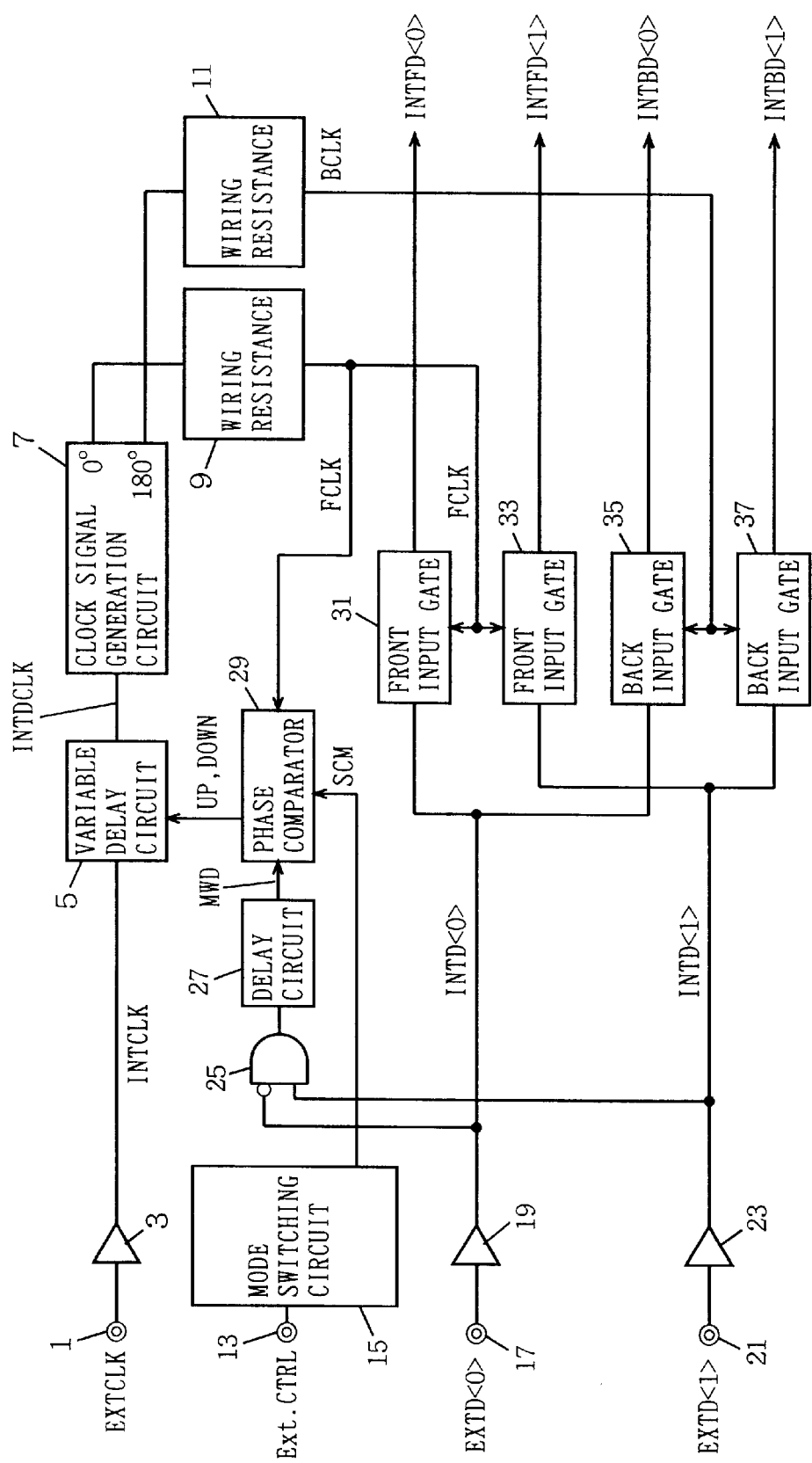
FIG. 1 shows an overall structure of an input signal phase compensation circuit in accordance with a first embodiment of the present invention.

Now, the embodiments of the present invention will be described in detail with reference to the drawings. The same and corresponding parts throughout the figures are designated by the same reference characters.

First Embodiment

FIG. 1 shows a structure of an input signal phase compensation circuit in accordance with a first embodiment of the present invention.

As shown in FIG. 1, the input signal phase compensation circuit includes an external clock signal input terminal 1 supplied with an external clock signal EXTCLK, a clock signal input buffer 3 connected to external clock signal input terminal 1, a variable delay circuit connected to clock signal input buffer 3, a clock signal generation circuit 7 connected to variable delay circuit 5, wiring resistances 9, 11 connected to clock signal generation circuit 7, an external data signal input terminal 17 supplied with an external data signal EXTD <0>, a data input buffer 19 connected to external data signal input terminal 17, an external data signal input terminal 21 supplied with an external data signal EXTD <1>, a data input buffer 23 connected to external data signal input terminal 21, a logic gate 25 connected to data input buffers 19, 23, and a delay circuit 27 connected to logic gate 25.

The input signal compensation circuit further includes an external control signal input terminal 13 supplied with an external control signal, a mode switching circuit 15 switching between a skew compensation (monitor) mode and a normal operation mode, a phase comparator 29 connected to delay circuit 27 and wiring resistance 9, comparing the phase of a monitored write data signal MWD output from delay circuit 27 with the phase of clock signal FCLK output from wiring resistance 9 in response to a skew compensation mode signal SCM from mode switching circuit 15 and supplying variable delay circuit 5 with signals UP and DOWN determining the amount of delay, a front input gate 31 connected to data input buffer 19 and latching internal data signal INTD <0> in response to clock signal FCLK output from wiring resistance 9, a back input gate 35 connected to data input buffer 19 and latching internal data signal INTD <0> in response to a clock signal BCLK output from wiring resistance 11, a front input gate 33 connected to data input buffer 23 and latching internal data signal INTD <1> in response to clock signal FCLK, and a back input gate 37 connected to data input buffer 23 and latching internal data signal INTD <1> in response to clock signal BCLK.

Figure 2:
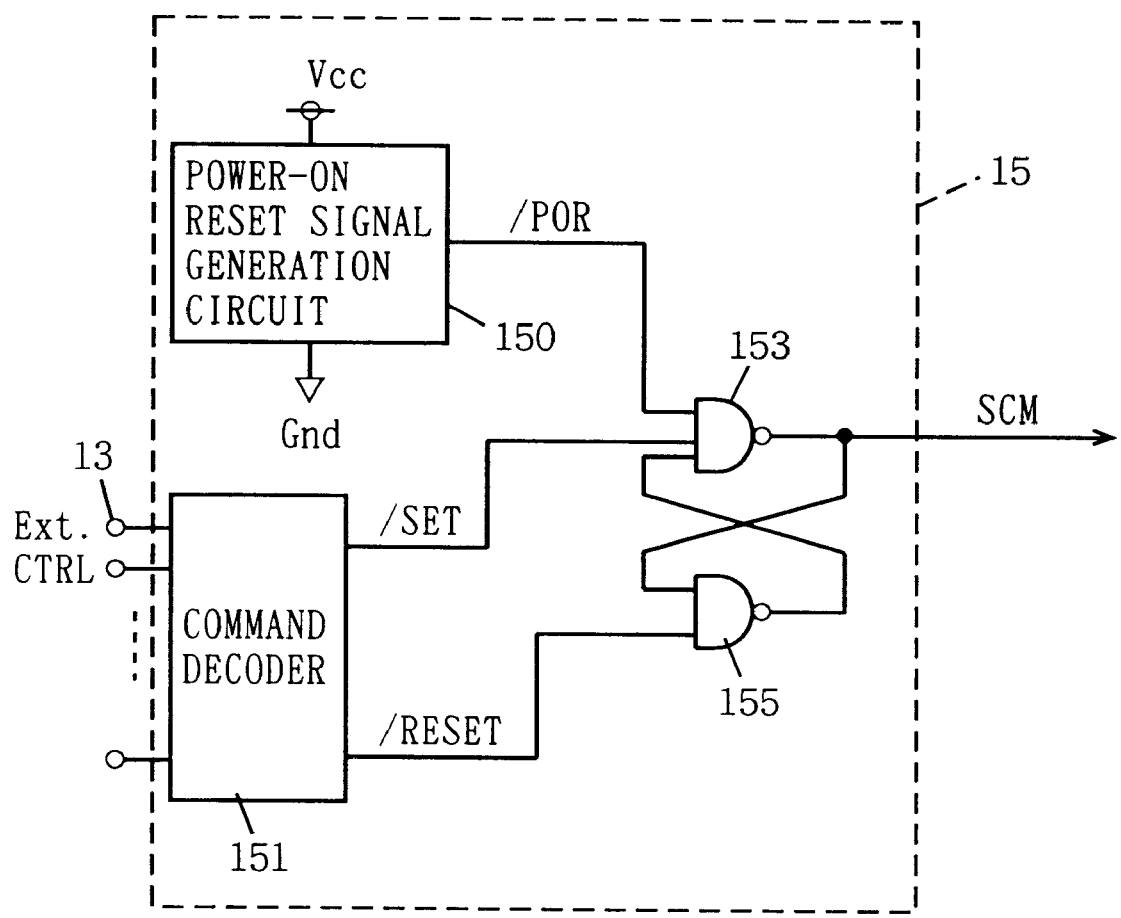
FIG. 2 shows a structure of a mode switching circuit shown in FIG. 1.

FIG. 2 shows a structure of mode switching circuit 15 shown in FIG. 1. As shown in FIG. 2, mode switching circuit 15 includes a power-on reset signal generation circuit 150, a command decoder 151, and NAND circuits 153, 155.

Figure 4:
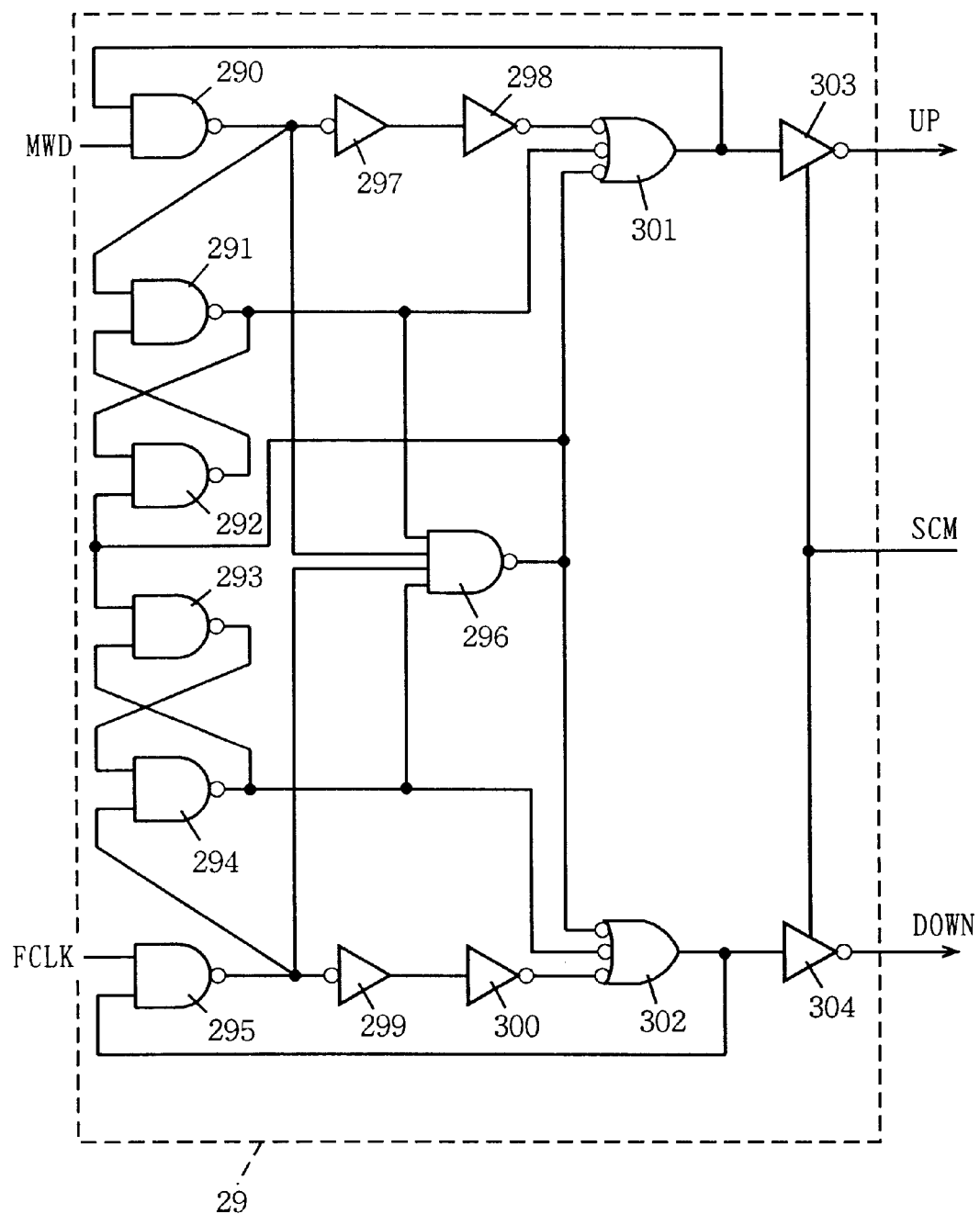
FIG. 4 is a circuit diagram showing a structure of a phase comparator shown in FIG. 1.

FIG. 4 shows a structure of phase comparator 29 shown in FIG. 1. As shown in FIG. 4, phase comparator 29 includes NAND circuits 290 to 296, inverters 297 to 300, logic circuits 301, 302, and clocked inverters 303, 304, and it is activated upon reception of skew compensation mode signal SCM having a high level.

Figure 5:
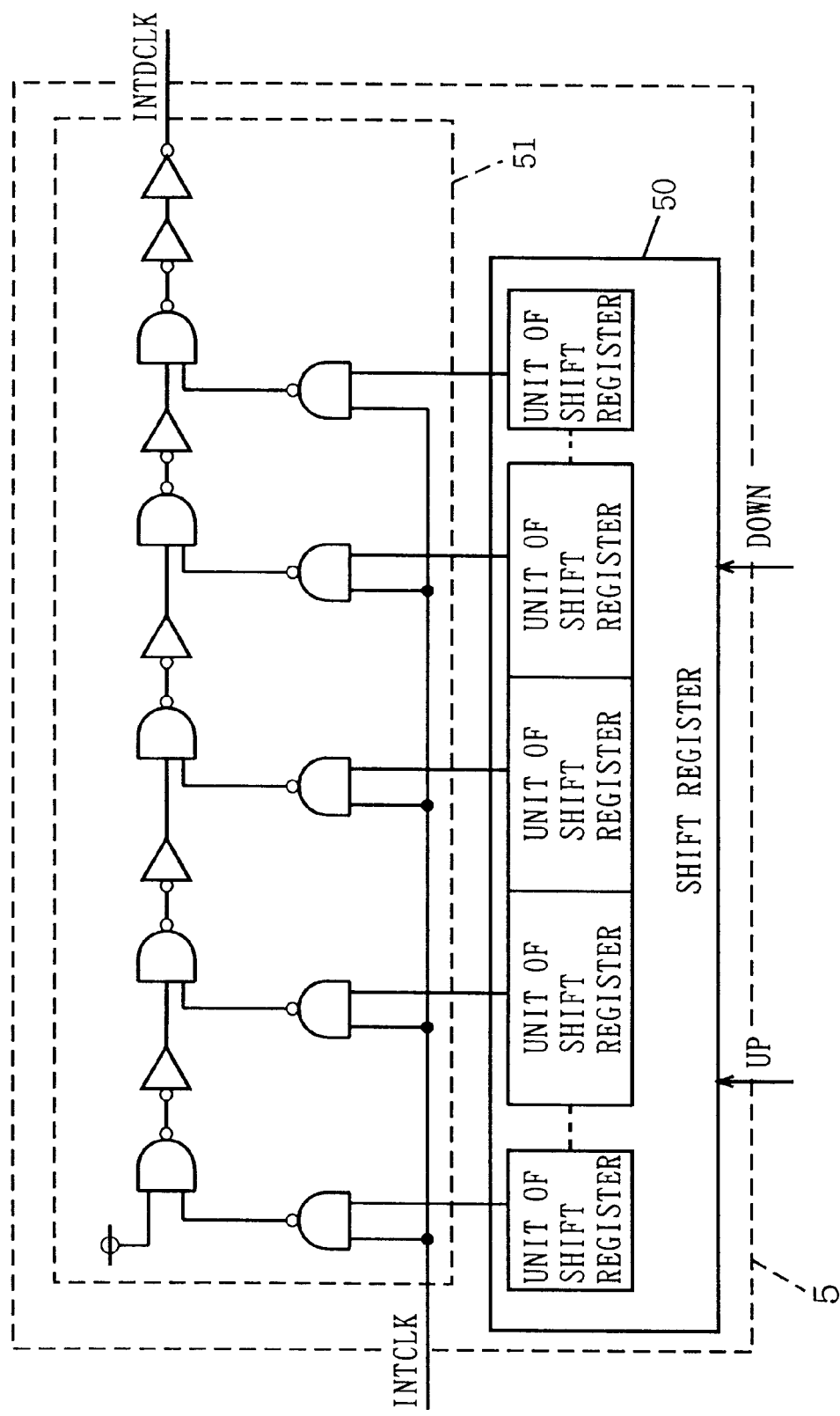
FIG. 5 shows a structure of a variable delay circuit shown in FIG. 1.

FIG. 5 shows a structure of variable delay circuit 5 shown in FIG. 1. As shown in FIG. 5, variable delay circuit 5 includes a delay line 51 and a shift register 50.

Operation of the input signal phase compensation circuit in accordance with this embodiment will be described below. This circuit has a skew compensation (monitor) mode and a normal operation mode which are switched by mode switching circuit 15.

Figure 3:
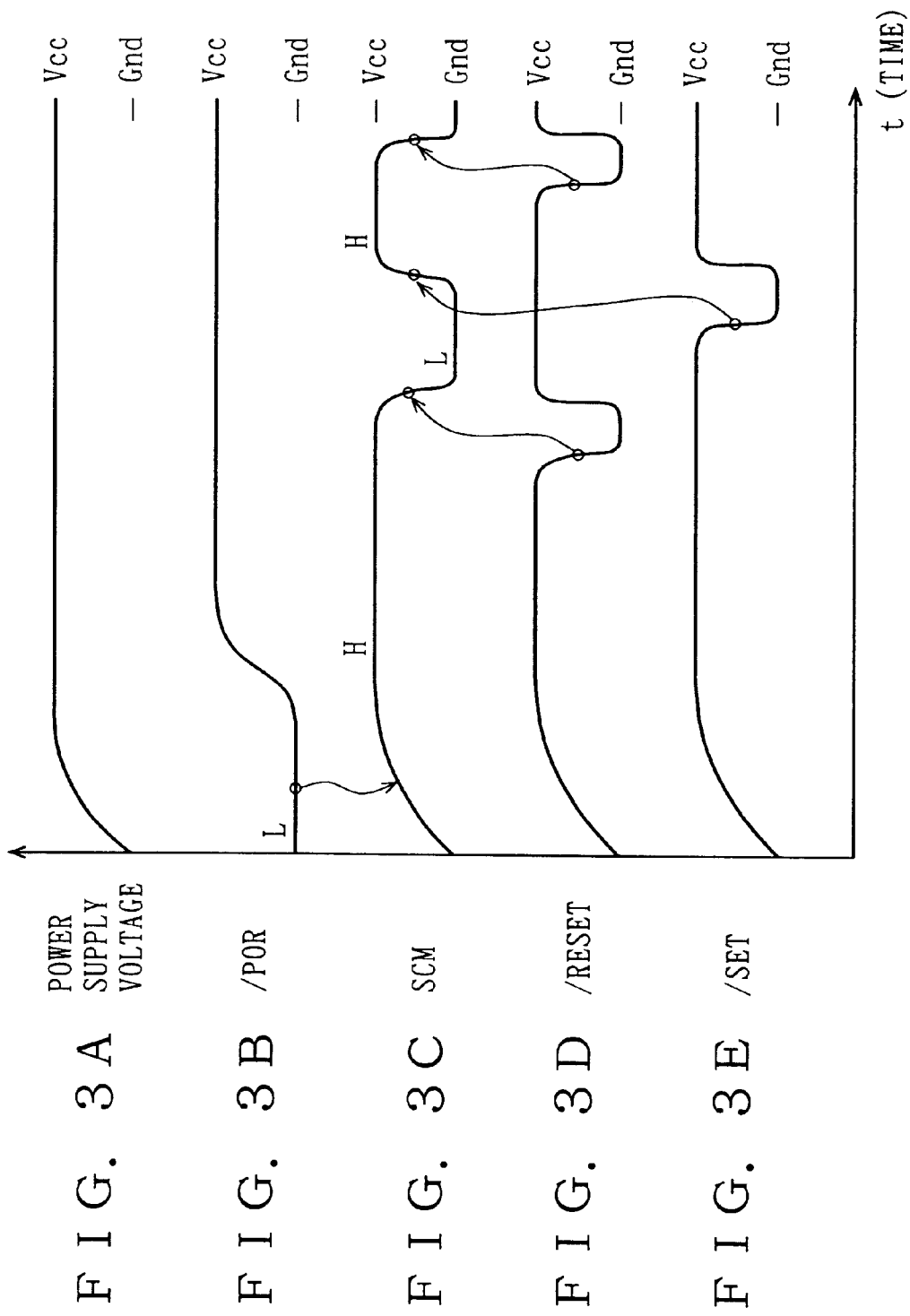
FIGS. 3A to 3E are timing charts illustrating operation of the mode switching circuit shown in FIG. 2.

FIGS. 3A to 3E are timing charts illustrating operation of mode switching circuit 15 shown in FIG. 2. As shown in FIGS. 3A and 3B, a power-on reset signal/POR is at the Gnd (L) level when a power supply is turned on. Therefore, skew compensation mode signal SCM of the Vcc (H) level is output to phase comparator 29 from NAND circuit 153 as shown in FIG. 3C. Accordingly, phase comparator 29 is activated, and operation of the input signal phase compensation circuit is switched to the skew compensation mode.

As shown in FIGS. 3C, 3D and 3E, when external control signal Ext.CTRL supplied to external control signal input terminal 13 causes a set signal/SET to attain the H level and then a reset signal/RESET to attain the L level, skew compensation mode signal SCM falls to the L level. Thus, phase comparator 29 is inactivated, and operation of the input signal phase compensation circuit is switched to the normal operation mode.

Further, when set signal/SET is lowered to the L level, skew compensation mode signal SCM attains the H level again as shown in FIGS. 3C and 3E. Thus, operation of the input signal phase compensation circuit is switched to the skew compensation mode.

Operation of the input signal phase compensation circuit in the skew compensation mode will be described below with reference to timing charts of FIGS. 6A to 6L.

A memory controller (not shown) outputs external clock signal EXTCLK and external data signals EXTD<0>, EXTD<1>. At the rising edge of external clock signal EXTCLK, external data signals EXTD <0> and EXTD <1> are at the H and L levels.

At the falling edge of external clock signal EXTCLK, external data signals EXTD <0> and EXTD <1> are at the L and H levels.

The memory controller outputs signals according to such a rule because a valid period of data can accurately be detected in data reception even if the phases of external data signals EXTD <0> and EXTD <1> are shifted nearly a half wavelength (180°) from the phase of external clock signal EXTCLK.

Figure 6:
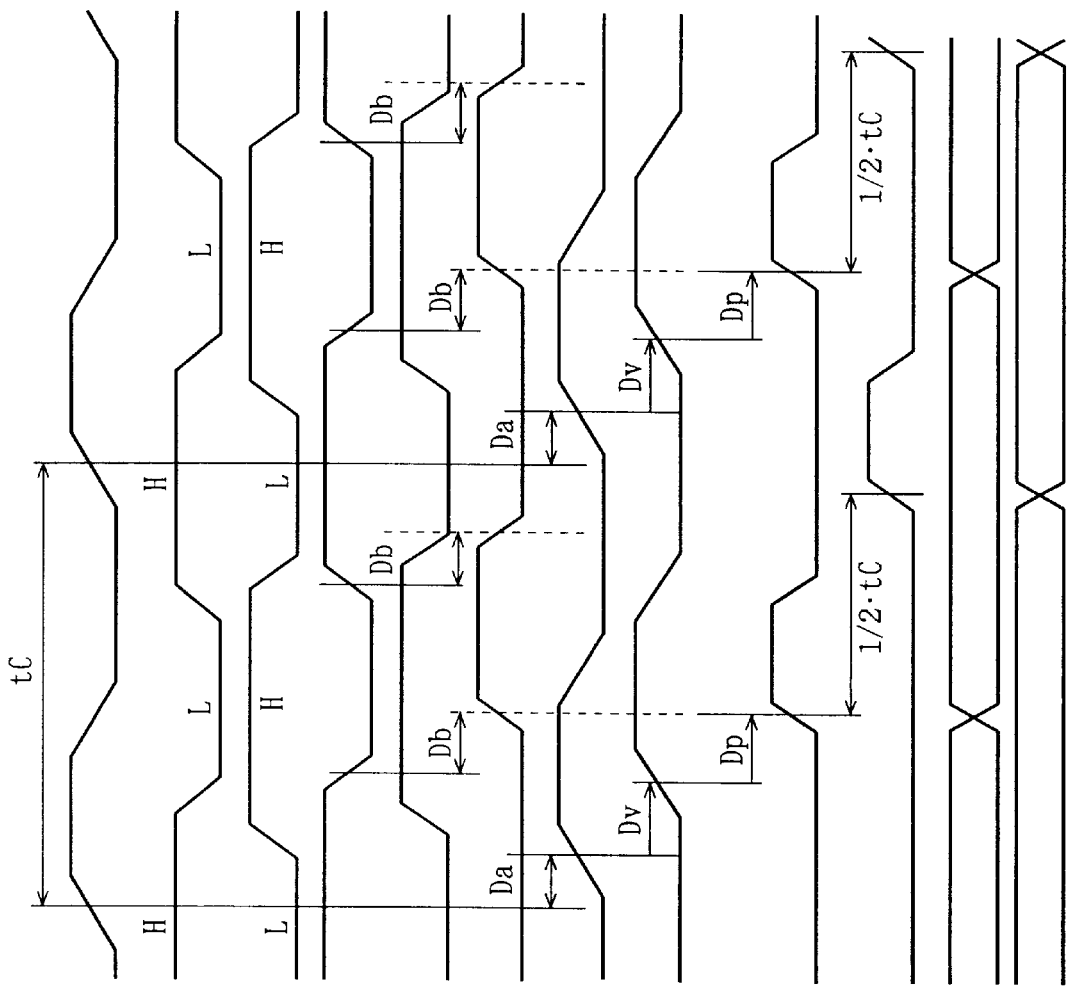
FIGS. 6A to 6L are timing charts illustrating operation of an input signal phase compensation circuit shown in FIG. 1.

External clock signal EXTCLK output from the memory controller is supplied to external clock signal input terminal 1, and buffered at clock signal input buffer 3. As shown in FIGS. 6A and 6G, external clock signal EXTCLK is then delayed time Da, and internal clock signal INTCLK is generated.

On the other hand, external data signals EXTD <0> and EXTD <1> output from the memory controller are respectively supplied to external data signal input terminals 17, 21, and buffered at respective data input buffers 19, 23. Then, internal data signal INTD <0> is output from data input buffer 19, and internal data signal INTD <1> is output from data input buffer 23.

Internal data signals INTD <0> and INTD <1> are both input to logic gate 25. Logic gate 25 outputs a high level signal only when internal data signal INTD <0> is at the L level and internal data signal INTD <1> is at the H level. This signal is delayed in delay circuit 27, and monitored write data signal MWD shown in FIG. 6F is generated. Here, delay in the signal in logic gate 25 and delay circuit 27 is indicated as time Db. This time Db corresponds to a phase margin for receiving data (setup/hold).

Internal clock signal INTCLK shown in FIG. 6G is delayed time Dv in variable delay circuit 5, and internal data clock signal INTDCLK shown in FIG. 6H is generated.

In clock signal generation circuit 7, internal data clock signal INTDCLK generates a clock signal in phase with internal data clock signal INTDCLK, and also generates a clock signal phase shifted by 180°.

These two clock signals are delayed time Dp by respective wiring resistances 9, 11, and clock signals FCLK, BCLK shown in FIGS. 6I and 6J are generated.

Phase comparator 29 compares phases of monitored write data signal MWD and clock signal FCLK shown in FIGS. 6F and 6I, and determines time Dv for delaying internal clock signal INTCLK by controlling variable delay circuit 5 so as to match phases of the both signals.

The phase compensation operation in the skew compensation mode is completed in this way.

In a write operation of a device as the normal operation mode, time Dv for delaying the internal clock signal in variable delay circuit 5 is fixed, and internal data signal INTD <0> is latched by clock signal FCLK at front input gate 31 and by clock signal BCLK at back input gate 35 as shown in FIGS. 6I to 6L. As shown in FIGS. 6K and 6L, internal data signal INTD <0> latched at front input gate 31 and back input gate 35 is driven into the device as internal data signals INTFD <0> and INTBD <0>.

Similarly, internal data signal INTD <1> is latched by clock signal FCLK at front input gate 33 and by clock signal BCLK at back input gate 37.

As described above, according to the input signal phase compensation circuit in accordance with the first embodiment, two signals, that is, internal data signal INTD <0> and internal data signal INTD <1> which is phase shifted 180° are monitored to adjust the phase of internal clock signal INTCLK. The phase can reliably be compensated with respect to a data signal even in an operation by external clock signal EXTCLK of high frequency.

Even when a plurality of other external data signals EXTD <2> and EXTD <3>, not shown, are input, data having a compensated phase can be obtained by latching internal data signals INTD <2> and INTD <3> using corresponding clock signals FCLK and BCLK.

Of course, the phase compensation operation by the input signal phase compensation circuit is effective for obtaining not only external data but data such as an external address signal or an external control signal.

Second Embodiment

Figure 7:
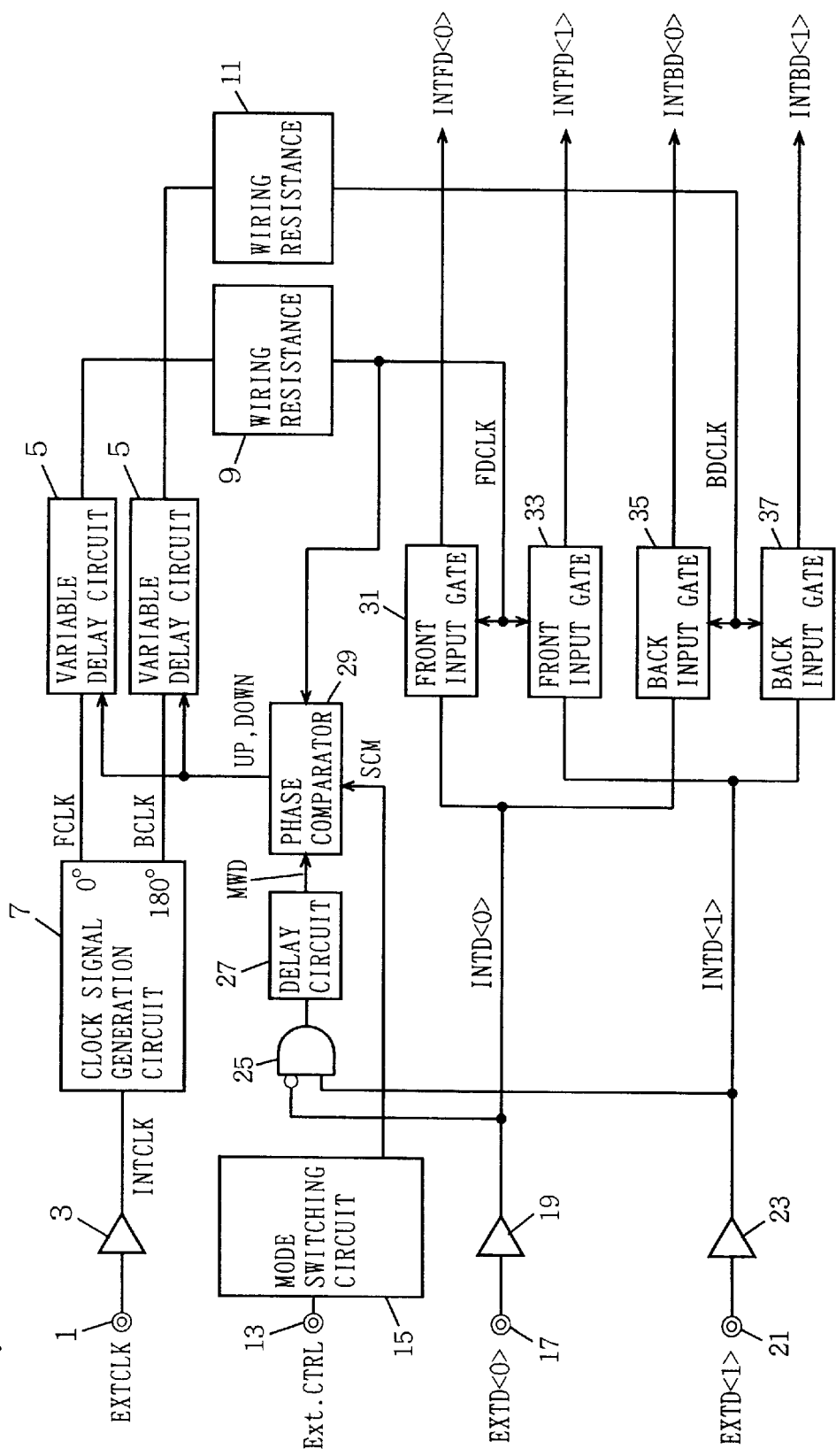
FIG. 7 shows an overall structure of an input signal phase compensation circuit in accordance with a second embodiment of the present invention.

FIG. 7 shows an overall structure of an input signal phase compensation circuit in accordance with a second embodiment of the present invention.

As shown in FIG. 7, the input signal phase compensation circuit has the same structure as the input signal phase compensation circuit in accordance with the first embodiment shown in FIG. 1 except that a clock signal generation circuit 7 is connected to clock signal input buffer 3 and two variable delay circuits 5 controlled by phase comparator 29 are connected to clock signal generation circuit 7.

Operation of the input signal phase compensation circuit in accordance with the second embodiment in the skew compensation mode will be described below with reference to timing charts of FIGS. 8A to 8J.

Figure 8:
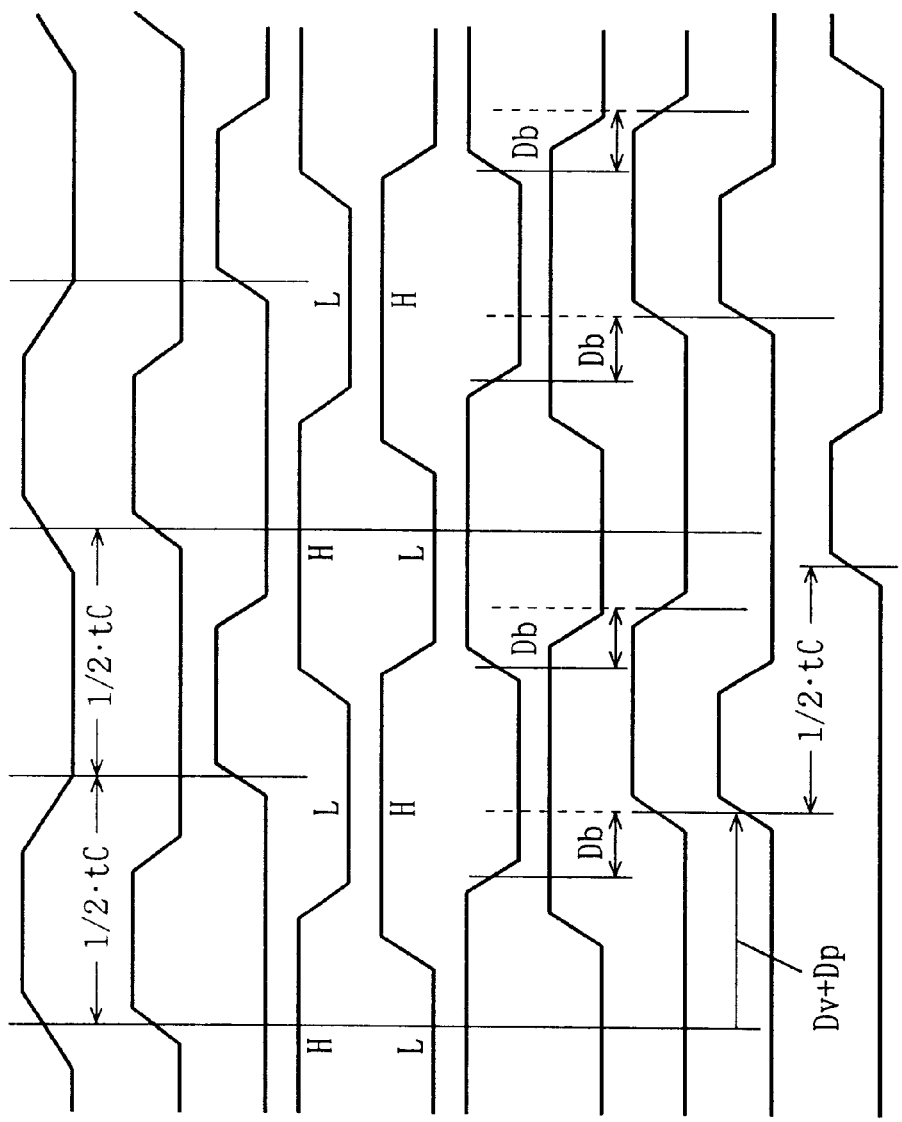
FIGS. 8A to 8J are timing charts illustrating operation of the input signal phase compensation circuit shown in FIG. 7.

Internal clock signal INTCLK shown in FIG. 8A is input to clock signal generation circuit 7, and clock signal FCLK in phase with internal clock signal INTCLK and clock signal BCLK phase shifted by 180° (½·tC) are generated as shown in FIGS. 8B and 8C. These clock signals FCLK, BCLK are input to corresponding variable delay circuits 5 and delayed time Dv. Signals output from variable delay circuits 5 are delayed time Dp by wiring resistances 9, 11, and clock signals FDCLK, BDCLK shown in FIGS. 8I and 8J are generated.

Here, clock signal FDCLK is input to phase comparator 29 which compares its phase with the phase of monitored write data signal MWD shown in FIG. 8H.

Phase comparator 29 determines common time Dv for delaying respective clock signals FCLK and BCLK in two variable delay circuits 5 so as to match phases of clock signal FDCLK and monitored write data signal MWD.

The phase compensation operation in the skew compensation mode is completed in this way. In the normal operation mode, internal data signals INTD <0> and INTD <1> are latched by clock signals FDCLK and BDCLK shown in FIGS. 8I and 8J at front input gates 31, 33 and back input gates 35, 37.

As described above, the same results as in the input signal phase compensation circuit in accordance with the first embodiment can be obtained in the input signal phase compensation circuit in accordance with the second embodiment as well.

Third Embodiment

Figure 9:
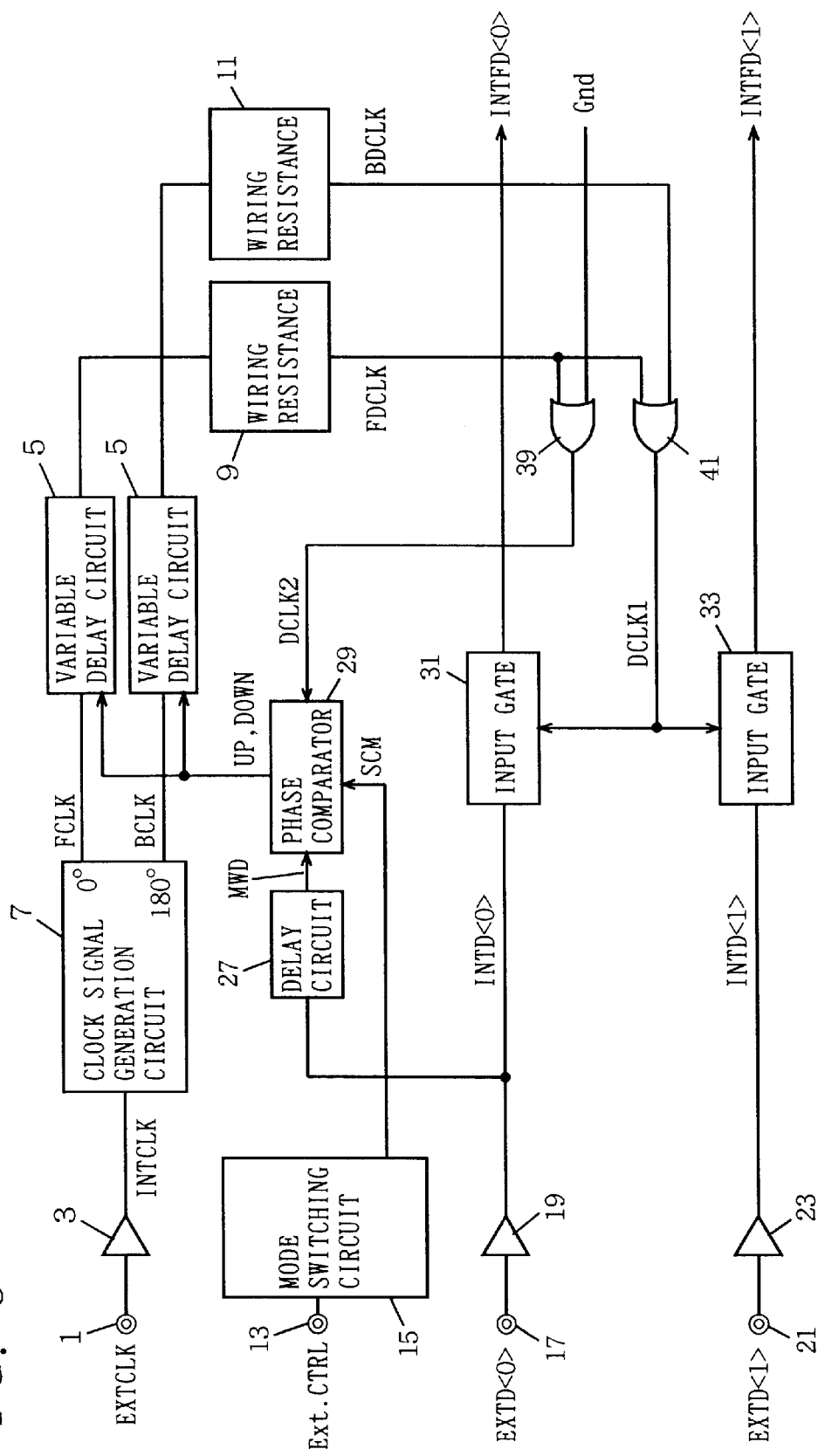
FIG. 9 shows an overall structure of an input signal phase compensation circuit in accordance with a third embodiment of the present invention.

FIG. 9 shows an overall structure of an input signal phase compensation circuit in accordance with a third embodiment of the present invention.

As shown in FIG. 9, the input signal phase compensation circuit has almost the same structure as the input signal phase compensation circuit in accordance with second embodiment shown in FIG. 7. However, it differs in the following points. The input signal phase compensation circuit in accordance with the third embodiment has an OR circuit 39 having its input end connected to a ground node and to wiring resistance 9 and its output end connected to phase comparator 29, and an OR circuit 41 having its input end connected to two wiring resistances 9, 11. Input gates 31, 33 are respectively connected to data input buffers 19, 23, and the output end of OR circuit 41 is connected to input gates 31, 33.

Operation of the input signal phase compensation circuit in accordance with the third embodiment in the skew compensation mode will be described below with reference to timing charts of FIGS. 10A to 10L.

Figure 10:
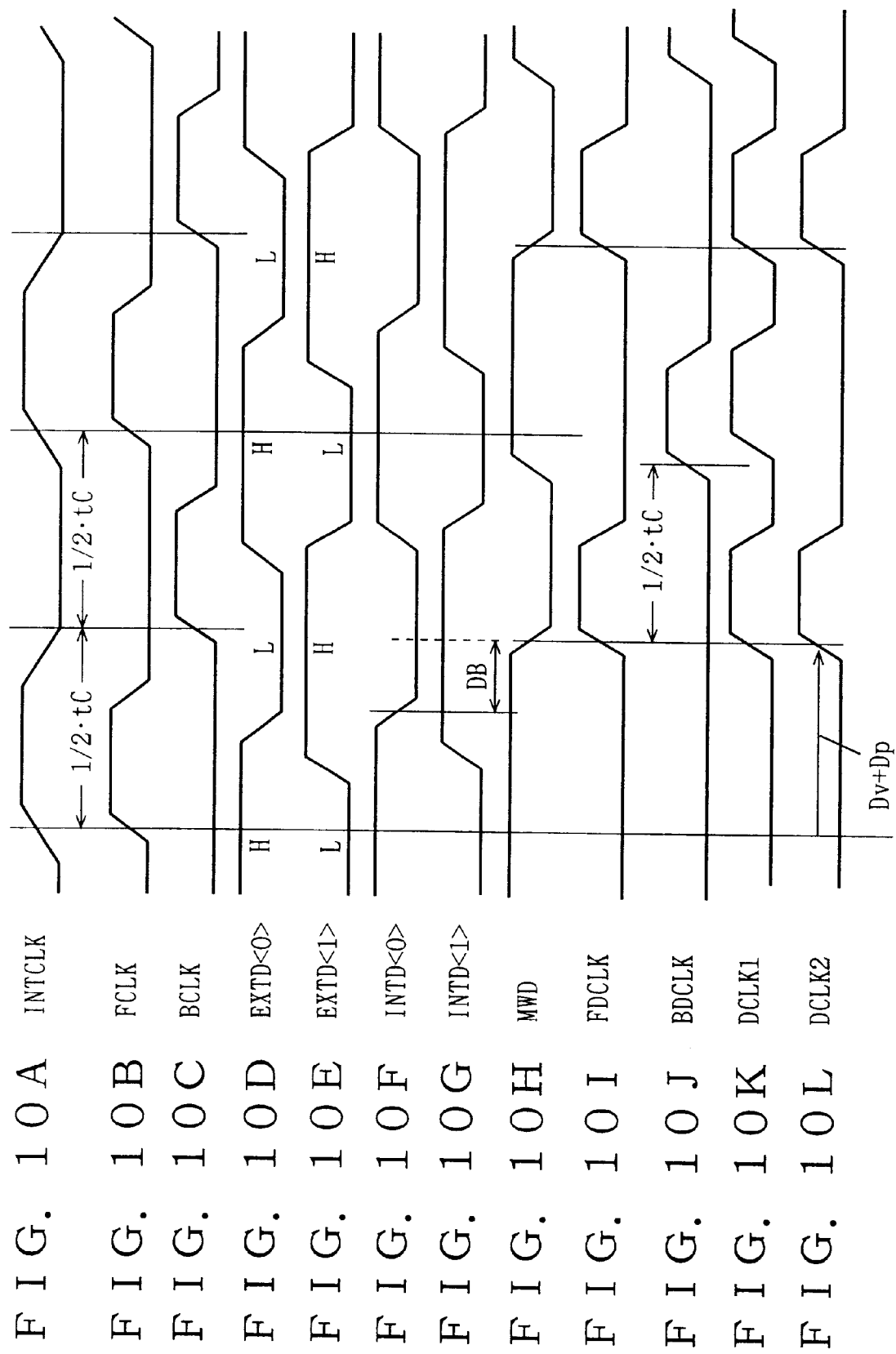
FIGS. 10A to 10L are timing charts illustrating operation of the input signal phase compensation circuit shown in FIG. 9.

From OR circuit 39 receiving clock signal FDCLK shown in FIG. 10I and a signal of the Gnd (L) level, a clock DCLK2 shown in FIG. 10L is supplied to phase comparator 29.

Phase comparator 29 compares the phase of monitored write data signal MWD shown in FIG. 10H, which is generated by delaying internal data signal INTD <0> shown in FIG. 10F by time DB in delay circuit 27 with the phase of clock signal DCLK2, and determines time Dv for delaying in two variable delay circuits 5 so as to match phases of clock signal DCLK2 and monitored write data signal MWD.

The skew compensation mode operation is completed in this way. In the normal operation mode, clock signals FDCLK and BDCLK shown in FIGS. 10I and 10J are input, and a clock signal DCLK1 shown in FIG. 10K, output from OR circuit 41 is supplied to input gates 31, 33. Accordingly, internal data signals INTD <0> and INT <1> are latched by clock signal DCLK1 at respective input gates 31, 33.

As described above, the same results as in the input signal phase compensation circuit in accordance with the first embodiment can be obtained in the input signal phase compensation circuit in accordance with the third embodiment. While the input signal phase compensation circuit in accordance with the first or second embodiment requires a total of four gates, i.e., two front input gates 31, 33 and two back input gates 35, 37, the number of input gates can effectively be halved to two, that is, two input gates 31, 33 in the third embodiment.

Although phase comparator 29 compares only the phase of clock signal FCLK with the phase of monitored write data signal MWD in the input signal phase compensation circuit in accordance with the first to third embodiments, it may compare the phase of clock signal BCLK with that of MWD. The same can be true for a circuit comparing phases of clock signal FCLK and clock signal BCLK in order to improve the accuracy of phase comparison.

Fourth Embodiment

Figure 11:
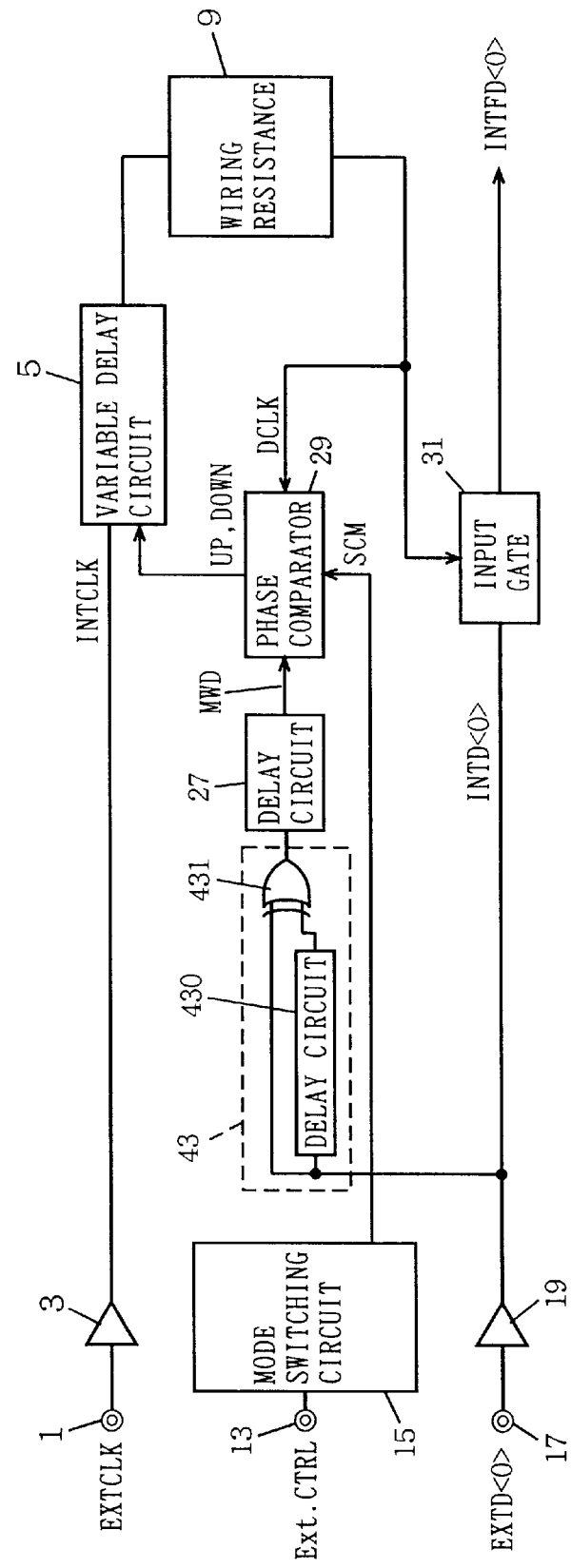
FIG. 11 shows an overall structure of an input signal phase compensation circuit in accordance with a fourth embodiment of the present invention.

FIG. 11 shows an overall structure of an input signal phase compensation circuit in accordance with a fourth embodiment of the present invention.

As shown in FIG. 11, the input signal phase compensation circuit has the same structure as the input signal phase compensation circuits in accordance with the first to third embodiments. Although the circuits of the first to third embodiments correspond to double data rate input, the circuit in accordance with the fourth embodiment is designed to input at the single data rate.

The input signal phase compensation circuits differs from those in the first to third embodiments in that a data transition detection (DTD) circuit 43 is connected between data input buffer 19 and delay circuit 27.

DTD circuit 43 includes a delay circuit 430 generating an internal data signal INTD1 <0> by delaying internal data signal INTD <0> by time D0, and an exclusive OR circuit 431 receiving internal data signals INTD <0>, INTD1 <0>.

Operation of the input signal phase compensation circuit in accordance with the fourth embodiment in the skew compensation mode will be described below with reference to timing charts of FIGS. 12A to 12H.

External clock signal EXTCLK shown in FIG. 12A is supplied to external clock signal input terminal 1 and buffered at clock signal input buffer 3 to generate internal clock signal INTCLK shown in FIG. 12B.

Internal clock signal INTCLK is delayed time Dv in variable delay circuit 5, and it is further delayed time Dp by wiring resistance 9, thus a clock signal DCLK shown in FIG. 12H is generated.

On the other hand, external data signal EXTD <0> shown in FIG. 12C is supplied to external data signal input terminal 17 and buffered at data input buffer 19 to generate internal data signal INTD <0> shown in FIG. 12D. Internal data signal INTD <0> is input to exclusive OR circuit 431 and delayed in delay circuit 430, and a signal INTD1 <0> delayed by time DO, shown in FIG. 12E, is input to exclusive OR circuit 431.

Thus, exclusive OR circuit 431 outputs an internal data signal INTD2 <0> shown in FIG. 12F. This signal is delayed time D1 in delay circuit 27, and monitored write data signal MWD shown in FIG. 12G is input to phase comparator 29.

Phase comparator 29 compares phases of clock signal DCLK shown in FIG. 12H and monitored write data signal MWD, and determines time Dv for delaying internal clock signal INTCLK in variable delay circuit 5 so as to match phases of clock signal DCLK and monitored write data signal MWD.

The phase compensation operation in the skew compensation mode is completed in this way. Time Dv for delaying in variable delay circuit 5 is fixed in the normal operation mode. Further, in response to a rising edge of clock signal DCLK shown in FIG. 12H, internal data INTD <0> is latched at input gate 31.

As described above, according to the input signal phase compensation circuit in accordance with the fourth embodiment, data having setup/hold time compensated can be obtained in the normal operation mode, as in the circuits in accordance with the embodiments.

Although the input signal phase compensation circuit in accordance with the fourth embodiment only compensates for a phase with respect to rising of external data EXTD <0>, it has a simplified structure and reduced circuit area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input signal phase compensation circuit having a monitor mode and a normal operation mode, comprising:

external clock signal reception means for generating a first internal clock signal by buffering an external clock signal;

external data signal reception means for generating an internal data signal by buffering an external data signal;

delay means connected to said external data signal reception means for delaying said internal data signal for a prescribed time period;

first phase compensation means connected to said external clock signal reception means for determining, in said monitor mode, time for delaying said first internal clock signal so as to match phases of said first internal clock signal and a signal output from said delay means and for generating, in said normal operation mode, a second internal clock signal by delaying said first internal clock signal by the time which is determined in said monitor mode; and latch means connected to said external data signal reception means for latching said internal data signal in response to said second internal clock signal.

2. The input signal phase compensation circuit according to claim 1, further comprising clock signal generation means connected to said first phase compensation means for generating a third internal clock signal which is phase shifted by 180° from said second internal clock signal; wherein said external data signal reception means includes first external data buffering means for generating a first internal data signal by buffering a first external data signal, second external data buffering means for generating a second internal data signal by buffering a second external data signal which is phase shifted by 180° from said first external data signal, and a logic gate receiving said first and second internal data signals and outputting an active signal only when these two signals have prescribed different logic levels; and wherein said latch means includes a first input gate connected to said first external data buffering means and latching said first internal data signal in response to said second internal clock signal, a second input gate connected to said first external data buffering means and latching said first internal data signal in response to said third internal clock signal, a third input gate connected to said second external data buffering means and latching said second internal data signal in response to said second internal clock signal, and a fourth input gate connected to said second external data buffering means and latching said second internal data signal in response to said third internal clock signal.

3. The input signal phase compensation circuit according to claim 2, further comprising mode switching means for switching to said monitor mode when a power supply is turned on.

4. The input signal phase compensation circuit according to claim 3, wherein said mode switching means switches to said monitor mode or said normal operation mode in response to an externally supplied control signal.

5. The input signal phase compensation circuit according to claim 1, further comprising:

clock signal generation means connected to said external clock signal reception means for generating a third internal clock signal which is phase shifted by 180° from said first internal clock signal; and second phase compensation means connected to said clock signal generation means for generating a fourth internal clock signal by delaying said third internal clock signal by the same time for which said first phase compensation means delays said first internal clock signal; wherein said external data signal reception means includes first external data buffering means for generating a first internal data signal by buffering a first external data signal, second external data buffering means for generating a second internal data signal by buffering a second external data signal which is phase shifted by 180° from said first external data signal, and a logic gate receiving said first and second internal data signals and outputting an active signal only when these two signals have prescribed different logic levels; and wherein said latch means includes a first input gate connected to said first external data buffering means and latching said first internal data signal in response to said second internal clock signal, a second input gate connected to said first external data buffering means and latching said first internal data signal in response to said fourth internal clock signal, a third input gate connected to said second external data buffering means and latching said second internal data signal in response to said second internal clock signal, and a fourth input gate connected to said second external data buffering means and latching said second internal data signal in response to said fourth internal clock signal.

6. The input signal phase compensation circuit according to claim 5, further comprising mode switching means for switching to said monitor mode when a power supply is turned on.

7. The input signal phase compensation circuit according to claim 6, wherein said mode switching means switches to said monitor mode or said normal operation mode in response to an externally supplied control signal.

8. The input signal phase compensation circuit according to claim 1, further comprising mode switching means for switching to said monitor mode when a power supply is turned on.

9. The input signal phase compensation circuit according to claim 8, wherein said mode switching means switches to said monitor mode or said normal operation mode in response to an externally supplied control signal.

10. A synchronous semiconductor device comprising:

a clock input circuit for receiving an external clock signal and applying an internal clock signal responsive to a delay control signal;

a predetermined number of data pins each for monitoring data periodically changing between first and second logic levels in synchronization with the external clock signal in a monitor mode for receiving write data in a normal operation mode;

a data input buffer circuit for receiving data from said predetermined number of data pins and providing internal data;

a delay control circuit for generating the delay control signal in response to monitor data applied to said predetermined number of data pins; and a latch circuit for latching internal data from said data input buffer circuit in response to the internal clock signal in the normal mode.

11. The synchronous semiconductor device according to claim 10, wherein said delay control circuit includes a delay circuit for generating a delayed monitor signal in response to internal data associated with monitor data applied to said predetermined number of data pins, and a phase comparator for comparing phases of the internal clock signal and delayed monitor signal, and generating the delay control signal in response to the comparing result.

12. The synchronous semiconductor device according to claim 11, wherein the predetermined number is two, monitor data applied to the two data pins have different phases from each other, said delay control circuit further includes a logic circuit for generating a monitor signal in response to internal data associated with monitor data applied to the two data pins, and said delay circuit delays the monitor signal to generate the delayed monitor signal by a predetermined delay time associated with a setup time.

13. The synchronous semiconductor device according to claim 11, wherein the predetermined number is one, said delay circuit delays internal data associated with monitor data applied to the data pin to generate the delayed monitor signal by a predetermined delay time associated with a setup time.

14. The synchronous semiconductor device according to claim 11, wherein the predetermined number is one, said delay control circuit further includes a data transition detection circuit for generating a monitor signal, and said delay circuit delays the monitor signal to generate the delayed monitor signal by a predetermined delay time associated with a setup time.

15. The synchronous semiconductor device according to claim 11, wherein said phase comparator receives the internal clock signal through a logic gate.

16. The synchronous semiconductor device according to claim 10, wherein said clock input circuit includes (a) a clock input buffer for receiving the external clock signal and applying a buffered clock signal, (b) a variable delay circuit for delaying the buffered clock signal by a delay time responsive to the delay control signal to generate a delayed clock signal, and (c) a clock signal generation circuit for receiving the delayed clock signal, and applying the internal clock signal via a first wiring resistance and another internal clock signal having a phase different from the internal clock signal via a second wiring resistance, and said latch circuit includes a first latch for latching internal data in response to the internal clock signal and a second latch for latching internal data in response to the other internal clock signal.

17. The synchronous semiconductor device according to claim 10, wherein said clock input circuit includes (a) a clock input buffer for receiving the external clock signal and applying a buffered clock signal, (b) a clock signal generation circuit for receiving the buffered clock signal, and applying first and second clock signals having different phases from each other, (c) a first variable delay circuit for delaying the first clock signal by a first delay time responsive to the delay control signal to apply the internal clock signal via a first wiring resistance, (d) a second variable delay circuit for delaying the second clock signal by a second delay time responsive to the delay control signal to apply another internal clock signal via a second wiring resistance, and said latch circuit includes a first latch for latching internal data in response to the internal clock signal and a second latch for latching internal data in response to the other internal clock signal.

18. The synchronous semiconductor device according to claim 10, wherein said clock input circuit applies another internal clock signal having a phase different from the internal clock signal, and said latch circuit includes a latch for latching internal data in response to the internal clock signal and the other internal clock signal.

19. The synchronous semiconductor device according to claim 10, wherein said clock input circuit includes (a) a clock input buffer for receiving the external clock signal and applying a buffered clock signal, and (b) a variable delay circuit for delaying the buffered clock signal by a delay time responsive to the delay control signal to generate the internal clock signal via a wiring resistance.

20. The synchronous semiconductor device according to claim 10, wherein said clock input circuit applies another internal clock signal having a phase different by 180° from the internal clock signal, and said latch circuit latches internal data in response to the internal clock signal and the other internal clock signal.

* * * * *

UNITED STATES PATENT AND TRADEMARK OFFICE
CERTIFICATE OF CORRECTION

PATENT NO. : 5,987,619
DATED : November 16, 1999
INVENTOR(S) : Takeshi HAMAMOTO, et al.

It is certified that error appears in the above-identified patent and that said Letter Patent is hereby corrected as shown below:

Column 10, Claim 10, Line 43, after "for" insert --receiving--.

Line 46, after "mode" insert --and--.

Line 56, after "normal" insert --operation--.

Signed and Sealed this

Tenth Day of April, 2001

Attest:

NICHOLAS P. GODICI

*Attesting Officer*  *Acting Director of the United States Patent and Trademark Office*